(12) United States Patent
Zhang et al.

(10) Patent No.: US 9,473,427 B2
(45) Date of Patent: Oct. 18, 2016

(54) METHOD AND SYSTEM FOR DELIVERING REMINDER INFORMATION

(71) Applicant: Tencent Technology (Shenzhen) Company Limited, Shenzhen (CN)

(72) Inventors: Xiaolong Zhang, Shenzhen (CN); Tieming Huang, Shenzhen (CN); Wenjie Zhou, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 208 days.

(21) Appl. No.: 14/091,299

(22) Filed: Nov. 26, 2013

(65) Prior Publication Data

US 2014/0089436 A1 Mar. 27, 2014

Related U.S. Application Data

(63) Continuation of application No. PCT/CN2013/075957, filed on May 21, 2013.

(30) Foreign Application Priority Data

Jul. 13, 2012 (CN) .......................... 2012 1 0243224

(51) Int. Cl.
*G06F 15/16* (2006.01)
*H04L 12/58* (2006.01)

(52) U.S. Cl.
CPC ............... *H04L 51/00* (2013.01); *H04L 51/14* (2013.01); *H04L 51/24* (2013.01); *H04L 51/30* (2013.01)

(58) Field of Classification Search
CPC ....... H04L 51/30; H04L 51/24; H04L 51/00; H04L 51/14
See application file for complete search history.

(56) References Cited

U.S. PATENT DOCUMENTS 5,420,572 A * 5/1995 Dolin, Jr. ................ H04L 12/26
340/9.16

(Continued)

FOREIGN PATENT DOCUMENTS

| CN | 101202947 A | 6/2008 |
| CN | 101540968 A | 9/2009 |

(Continued)

OTHER PUBLICATIONS

Tencent Technology, ISRWO, PCT/CN2013/075957, Aug. 23, 2013, 10 pgs.
Tencent Technology, IPRP, PCT/CN2013/075957, Jan. 13, 2015, 7 pgs.

*Primary Examiner* — Oanh Duong
(74) *Attorney, Agent, or Firm* — Morgan, Lewis & Bockius LLP (57) ABSTRACT

A reminder information delivery method includes steps of: obtaining reminder information, where the reminder information includes reminding contents, reminding time, and a first account associated with a first communication client; when the reminding time comes, searching for a communication number associated with the first account; and pushing the reminder information to a corresponding communication terminal according to the communication number. By adopting the reminder information delivery method, reminding is implemented in a timely and flexible manner. In addition, a reminder information pushing system is also provided.

20 Claims, 8 Drawing Sheets

(56) References Cited

U.S. PATENT DOCUMENTS

| | | | |
|---|---|---|---|
| 5,920,576 A * | 7/1999 | Eaton | H04L 12/5875 714/748 |
| 8,799,016 B1 * | 8/2014 | Cohan | G06F 19/3456 705/2 |
| 2002/0178022 A1 | 11/2002 | Anderson et al. | |
| 2011/0288881 A1 | 11/2011 | Machani et al. | |
| 2012/0054279 A1 | 3/2012 | Dantee et al. | |
| 2013/0088337 A1 * | 4/2013 | Blanchflower | G08B 3/00 340/384.1 |

FOREIGN PATENT DOCUMENTS

| | | |
|---|---|---|
| CN | 101951348 A | 1/2011 |
| CN | 102035757 A | 4/2011 |
| CN | 102413417 A | 4/2012 |

* cited by examiner

METHOD AND SYSTEM FOR DELIVERING REMINDER INFORMATION

RELATED APPLICATIONS

This application is a continuation application of PCT Patent Application No. PCT/CN2013/075957, entitled "METHOD AND SYSTEM FOR DELIVERING REMINDER INFORMATION" filed on May 21, 2013, which claims priority to Chinese Patent Application No. 201210243224.6, entitled "REMINDER INFORMATION PUSHING METHOD AND SYSTEM," filed Jul. 13, 2012, both of which are incorporated by reference in their entirety.

TECHNICAL FIELD

The disclosed implementations relate generally to the field of network technologies, and in particular, to a reminder information delivery method and system.

BACKGROUND

With the development of network technologies, e-mails are closely linked to work and life of people. People are always accustomed to handling daily work and communicating with others through e-mails. For the convenience in managing the daily work, it is always required to remind a user of some schedules or important events.

In a conventional reminder information delivery method, reminder information including reminding contents and reminding time is usually generated by an e-mail client, then the reminder information is submitted to an e-mail server, and when the reminding time comes, the corresponding reminder information is delivered to the e-mail client, so as to remind a user in a manner of an-mail.

However, according to this conventional reminder information delivery method, because the user is reminded in a manner of an-mail, and the e-mail does not have an active reminding function, the user must log in the mailbox to receive the reminder information, so the reminding is not timely enough. Moreover, the reminding manner is single and is not flexible.

SUMMARY

Accordingly, in view of the problem in the prior art that the reminding is not timely enough, it is necessary to provide a reminder information delivery method that can implement reminding in a timely and flexible manner.

In some implementations, a method of automatically delivering reminder information to a user-designated terminal is performed at a computer system having one or more processors and memory for storing one or more programs to be executed by the processors. The computer system runs a first application to query a reminder information table for a reminder entry submitted by a first user from a first terminal remote from the server system, the reminder entry including a delivery schedule and multiple delivery destinations. The reminder entry is then forwarded from the first application to a second application in accordance with a data exchange protocol between the first application and the second application. The computer system runs the second application to choose a second terminal corresponding to one of the delivery destinations and deliver the reminder entry to the second terminal in accordance with the delivery schedule. After the delivery, the computer system checks whether there is a response from the second terminal, the response indicating an acknowledgement of receiving the reminder entry by a second user of the second terminal. If there is no response from the second terminal, the computer system substitutes the second terminal with a new terminal corresponding to another one of the delivery destinations in accordance with the delivery schedule and repeats the delivery of the reminder entry to the new terminal until receiving a response from the new terminal.

In some implementations, a computer system includes one or more processors, memory, and one or more program modules stored in the memory and to be executed by the one or more processors. The program modules include instructions for running a first application to query a reminder information table for a reminder entry submitted by a first user from a first terminal remote from the server system, the reminder entry including a delivery schedule and multiple delivery destinations; forwarding the reminder entry from the first application to a second application in accordance with a data exchange protocol between the first application and the second application; running the second application to choose a second terminal corresponding to one of the delivery destinations and deliver the reminder entry to the second terminal in accordance with the delivery schedule; checking whether there is a response from the second terminal, the response indicating an acknowledgement of receiving the reminder entry by a second user of the second terminal; if there is no response from the second terminal: substituting the second terminal with a new terminal corresponding to another one of the delivery destinations in accordance with the delivery schedule; and repeating the delivery of the reminder entry to the new terminal until receiving a response from the new terminal.

In some implementations, a method of processing a reminder request from a first user is performed at a client device having one or more processors and memory for storing one or more programs to be executed by the processors. The client device receives a user instruction of delivering a reminder to a second user. In response to the user instruction, the client device identifies at least two reminder delivery destinations associated with the second user and determines a reminder delivery order for the at least two reminder delivery destinations in accordance with a preference provided by the second user. Next, the client device generates a reminder request, the reminder request including identifiers associated with the at least two reminder delivery destinations and a delivery schedule including the delivery order, and submits the reminder request to a first application at a remote server. The first application then generates a reminder entry in a reminder information table using the reminder request and invokes a second application to deliver the reminder entry to terminals associated with the at least two reminder delivery destinations in accordance with the delivery order.

In some implementations, a client device includes one or more processors, memory, and one or more program modules stored in the memory and to be executed by the processors. The program modules include instructions for: receiving a user instruction of delivering a reminder to a second user; in response to the user instruction: identifying at least two reminder delivery destinations associated with the second user; determining a reminder delivery order for the at least two reminder delivery destinations in accordance with a preference provided by the second user; generating a reminder request, the reminder request including identifiers associated with the at least two reminder delivery destinations and a delivery schedule including the delivery order; and submitting the reminder request to a first application at a remote server, wherein the first application is configured to generate a reminder entry in a reminder information table using the reminder request and invoke a second application to deliver the reminder entry to terminals associated with the at least two reminder delivery destinations in accordance with the delivery order.

In some implementations, a reminder information delivery method includes steps of: obtaining reminder information, where the reminder information includes reminding contents, reminding time, and a first account associated with a first communication client; when the reminding time comes, searching for a communication number associated with the first account; and pushing the reminder information to a corresponding communication terminal according to the communication number.

In addition, it is further necessary to provide a reminder information pushing system that can implement reminding in a timely and flexible manner.

In some implementations, a reminder information pushing system includes a first communication server and a second communication server, where the first communication server is configured to obtain reminder information, where the reminder information includes reminding contents, reminding time, and a first account associated with a first communication client; the first communication server is further configured to, when the reminding time comes, search for a communication number associated with the first account; and send the reminder information and the communication number to the second communication server; and the second communication server is configured to push the reminder information to a corresponding communication terminal according to the communication number.

In some implementations, in a reminder information delivery method and system, when the reminding time comes, the communication number associated with the first account is searched for, and the reminder information is pushed to the corresponding communication terminal according to the communication number, thereby implementing the active pushing of the reminder information to the communication terminal, so that the user can receive the reminder information in time. Compared with the conventional manner in which the user can only be reminded with an e-mail, the reminder information can be received through a portable mobile communication terminal, so the implementation is more flexible.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
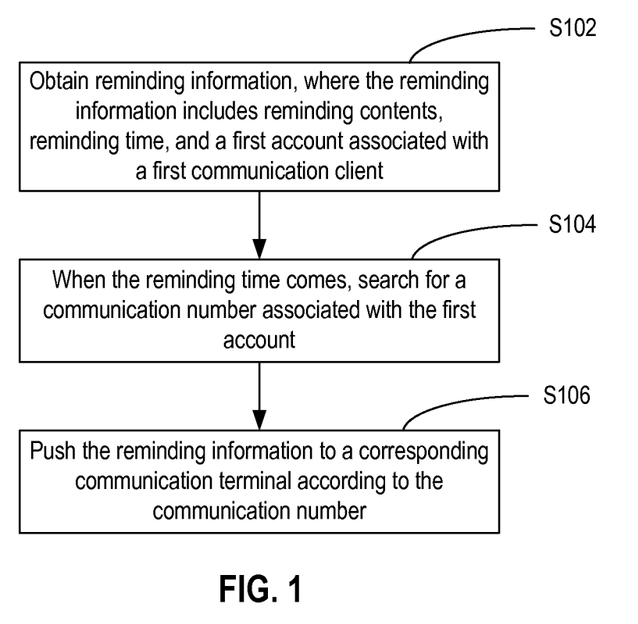
FIG. 1 is a schematic flow chart of a reminder information delivery method in an implementation.

As shown in FIG. 1, in an implementation, a reminder information delivery method includes the following steps.

Step S102: Obtain reminder information, where the reminder information includes reminding contents, reminding time, and a first account associated with a first communication client.

Specifically, a reminder information creation instruction may be received through a schedule management interface provided by the first communication client, and the input reminding contents and reminding time are obtained according to the reminder information creation instruction, where the reminding contents may include a schedule theme and schedule contents, and the reminding time includes a designated reminding date and a time interval for repeating reminding.

Furthermore, the first communication client obtains a first account used by a user for login, generates reminder information according to the input reminding contents and reminding time and the first account, and submits the reminder information to a first communication server. The first communication client may be an application client or a Web client.

Step S104: When the reminding time comes, search for a communication number associated with the first account.

The communication number may be one of an instant communication number, a mobile communication number, and a second account associated with a second communication client. In an implementation, before Step S102, the submitted first account and communication number bound to the first account may be obtained, and the first account and the communication number are associatively stored.

Specifically, the input communication number bound to the first account may be obtained through a binding interface provided by the first communication client, the first account and the communication number are submitted to the first communication server together, and the first communication server associatively stores the received first account and communication number bound to the first account.

Step S106: Push the reminder information to a corresponding communication terminal according to the communication number.

The reminder information is pushed to the corresponding communication terminal according to the communication number, thereby implementing the active pushing of the reminder information, so that the user can receive and view the reminder information in time. Compared with the conventional manner in which the user can only be reminded with an e-mail, the reminder information can be received through a portable mobile communication terminal, so the implementation is more flexible.

Figure 2:
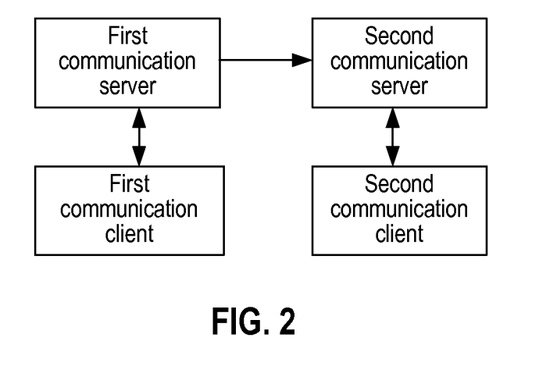
FIG. 2 is a diagram of an application scenario of a reminder information delivery method in an implementation.

In an implementation, the communication number may be the second account associated with the second communication client, where the second account may be an identification number used by the user for logging in the second communication client. As shown in FIG. 2, the first communication server stores the first account, the second account bound to the first account and the reminder information that are submitted by the first communication client. Specifically, the first communication server maintains a reminder information table, where the table may be divided into 1440 segments for each day (namely, each day has 1440 minutes). The first communication server receives the reminder information, and adds the reminder information to the reminder information table according to the reminding time and a corresponding time segment. Furthermore, the first communication server detects once a minute whether there is a reminding becoming effective, and if yes, extracts reminder information whose reminding time corresponds to the current time.

Furthermore, the first communication server searches for the second account associated with the first account in the extracted reminding number (namely, the stored second account bound to the first account), and sends the reminder information and the found second account to the second communication server. The second communication server pushes the reminder information to a corresponding communication terminal according to the found second account.

In an implementation, the first communication client may be an e-mail client, and the first account associated with the first communication client may be an e-mail account.

In an implementation, the second communication client may be an instant communication client, and the second account associated with the second communication client may be an instant communication number.

A situation that the second communication client is a WeChat client, and the second account is a WeChat number is taken as an example. Specifically, a WeChat server delivers, in a manner of delivering a WeChat message, the reminder information to a WeChat client corresponding to a found WeChat number, and the WeChat client running on a mobile communication terminal receives the reminder information delivered by the WeChat server.

Figure 3:
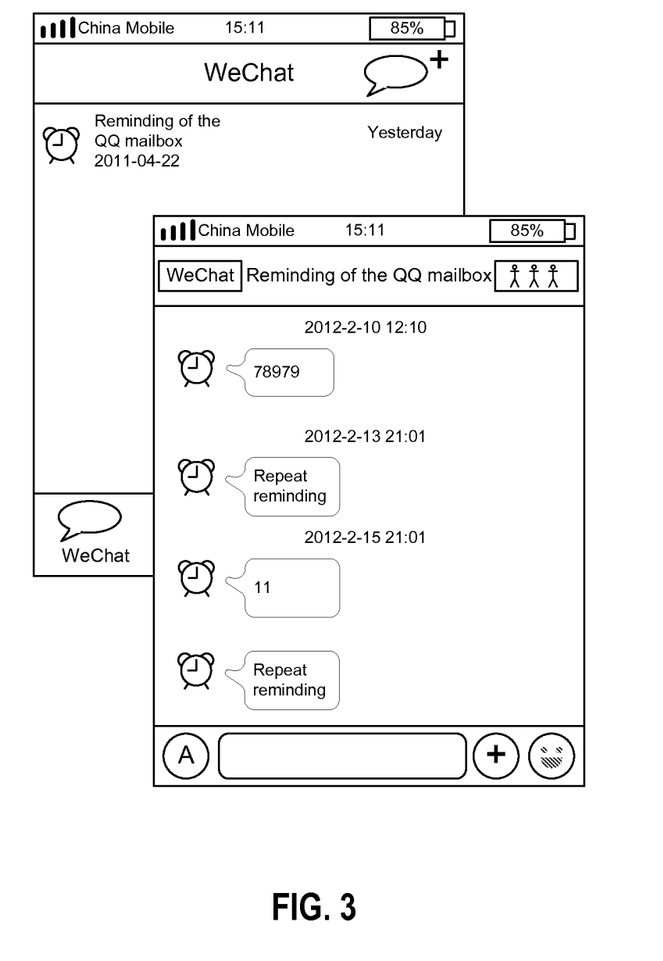
FIG. 3 is a schematic diagram illustrating that a WeChat client receives reminder information in an implementation.

As shown in FIG. 3, the WeChat client receives the reminder information, generates a WeChat message from a reminding of the e-mail box, and reminds, through a prompting tone, the user to view the message. After obtaining an operation of tapping the WeChat message, the WeChat client displays the reminding contents and the reminding time.

Because more and more users install various instant communication clients on mobile communication terminals, and perform instant communication through the instant communication clients, the reminder information is delivered to the mobile communication terminal in the form of a WeChat message, a channel for pushing the reminder information is expanded, so that the user can receive the reminder information in time, and view the reminder information at the first time, and the user can receive the reminding anytime and anywhere without limitation. The flexibility is improved, and the convenience of use is also improved.

In an implementation, the first communication client has a setting interface of starting or closing a reminding function, and may receive, through the setting interface, an instruction of starting or closing the reminding function, and start or close the reminding function according to the received instruction. Furthermore, when the first communication client adds a contact of "reminding of the e-mail box" to a blacklist, the second communication client will not receive a reminding message.

In an implementation, when the user registers the second communication client, the second communication server may obtain the instant communication number or the mobile communication number submitted by the second communication client, and generates the corresponding second account associated with the second communication client according to the instant communication number or the mobile communication number. Therefore, the second communication server may pre-store correspondence between the instant communication number or the mobile communication number and the second account.

In this implementation, the communication number may be the instant communication number or the mobile communication number. The first communication client may submit the instant communication number or the mobile communication number when submitting the communication number bound to the first account, and the first communication server associatively stores the e-mail account and the instant communication number or the mobile communication number bound to the e-mail account.

Furthermore, when the reminding time comes, the first communication server may search for the instant communication number or mobile communication number associated with the first account, and the reminder information and the found instant communication number or mobile communication number are sent to the second communication server. The second communication server searches for the second account associated with the second communication client and corresponding to the instant communication number or the mobile communication number, and pushes the reminder information to a corresponding communication terminal according to the found second account.

Furthermore, the reminder information may be received through the second communication client on the communication terminal. Specific details are described above, which are not described here again.

In an implementation, multiple options of the communication number bound to the first account may be provided in the binding interface of the first communication client, for the user to select one of the second account, the instant communication number, and the mobile communication number for binding. The first communication server associatively stores the submitted first account and the selected communication number.

In another implementation, the communication number is the mobile communication number, and the specific process of Step S106 is: pushing the reminder information to a communication terminal corresponding to the mobile communication number in the form of a short message.

Specifically, in this implementation, when the reminding time comes, the first communication server may search for the mobile communication number associated with the first account, the reminder information and the found mobile communication number are sent to a short message server, and the short message server sends the reminder information to the mobile communication terminal corresponding to the mobile communication number in the form of a short message.

Multiple options are provided for the user to select a communication number to be bound to the first account, so the use is convenient, and for different communication numbers, the reminder information may be pushed through different channels, thereby improving the flexibility of use and the timeliness of receiving the reminder information.

Figure 4:
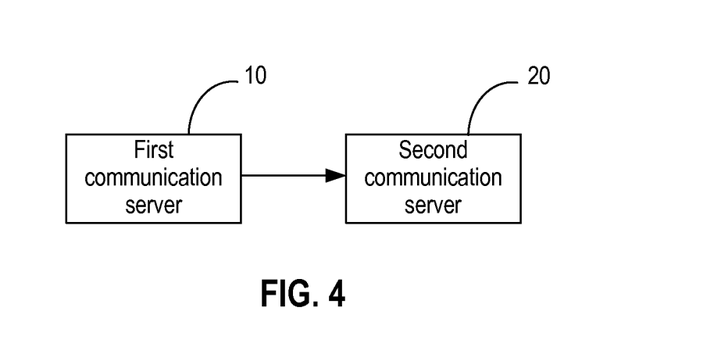
FIG. 4 is a schematic structural diagram of a reminder information pushing system in an implementation.

As shown in FIG. 4, in an implementation, a reminder information pushing system includes: a first communication server 10 and a second communication server 20.

The first communication server 10 is configured to obtain reminder information, where the reminder information includes reminding contents, reminding time, and a first account associated to a first communication client.

Specifically, a reminder information creation instruction may be received through a schedule management interface provided by the first communication client, and the input reminding contents and reminding time are obtained according to the reminder information creation instruction, where the reminding contents may include a schedule theme and schedule contents, and the reminding time includes a designated reminding date and a time interval for repeating reminding.

Furthermore, the first communication client obtains a first account used by a user for login, generates reminder information according to the input reminding contents and reminding time and the first account, and submits the reminder information to the first communication server 10. The first communication client may be an application client or a Web client.

The first communication server 10 is further configured to, when the reminding time comes, search for a communication number associated with the first account; and send the reminder information and the communication number to the second communication server 20.

The communication number may be one of an instant communication number, a mobile communication number, and a second account associated with a second communication client. In an implementation, the first communication server is further configured to obtain the submitted first account and communication number bound to the first account, and associatively store the first account and the communication number.

Specifically, the input communication number bound to the first account may be obtained through a binding interface provided by the first communication client, the first account and the communication number are submitted to the first communication server together, and the first communication server 10 associatively stores the received first account and communication number bound to the first account.

The second communication server 20 is configured to push the reminder information to a corresponding communication terminal according to the communication number.

In an implementation, the communication number may be the second account associated with the second communication client, where the second account may be an identification number used by the user for logging in the second communication client. The first communication server 10 stores the first account, the second account bound to the first account, and the reminder information that are submitted by the first communication client.

Specifically, the first communication server 10 maintains a reminder information table, where the table may be divided into 1440 segments for each day (namely, each day has 1440 minutes). The first communication server 10 receives the reminder information, and adds the reminder information to the reminder information table according to the reminding time and a corresponding time segment. Furthermore, the first communication server 10 detects once a minute whether there is a reminding becoming effective, and if yes, extracts reminder information whose reminding time corresponds to the current time.

Furthermore, the first communication server 10 searches for the second account associated with the first account in the extracted reminding number (namely, the stored second account bound to the first account), and sends the reminder information and the found second account to the second communication server 20. Furthermore, the second communication server 20 is configured to push the reminder information to a corresponding communication terminal according to the found second account.

In an implementation, the first communication server 10 may be an e-mail server, the first communication client may be an e-mail client, and the first account associated with the first communication client may be an e-mail account.

In an implementation, the second communication server 20 may be an instant communication server, the second communication client may be an instant communication client, and the second account associated with the second communication client may be an instant communication number.

A situation that the second communication client is a WeChat client, and the second account is a WeChat number is taken as an example. Specifically, a WeChat server delivers, in a manner of delivering a WeChat message, the reminder information to a WeChat client corresponding to a found WeChat number, and the WeChat client running on a mobile communication terminal receives the reminder information delivered by the WeChat server. As shown in FIG. 3, the WeChat client receives the reminder information, generates a WeChat message from a reminding of the e-mail box, and reminds, through a prompting tone, the user to view the message. After obtaining an operation of tapping the WeChat message, the WeChat client is configured to display the reminding contents and the reminding time.

In an implementation, when the user registers the second communication client, the second communication server 20 may obtain the instant communication number or the mobile communication number submitted by the second communication client, and generates the corresponding second account associated with the second communication client according to the instant communication number or the mobile communication number. Therefore, the second communication server 20 may pre-store correspondence between the instant communication number or the mobile communication number and the second account.

In this implementation, the communication number may be the instant communication number or the mobile communication number. The first communication client may submit the instant communication number or the mobile communication number when submitting the communication number bound to the first account, and the first communication server 10 associatively stores the first account and the instant communication number or the mobile communication number bound to the first account.

Furthermore, the first communication server 10 may be configured to, when the reminding time comes, search for the instant communication number or mobile communication number associated with the first account, and send the reminder information and the found instant communication number or mobile communication number to the second communication server 20. The second communication server 20 is configured to search for a WeChat number corresponding to the instant communication number or the mobile communication number, and push the reminder information to a corresponding mobile communication terminal according to the found second account.

In an implementation, the reminder information pushing system may further include the first communication client and the second communication client. Multiple options of the communication number bound to the first account may be provided in a binding interface of the first communication client, for the user to select one of the second account, the instant communication number, and the mobile communication number for binding. The first communication server 10 associatively stores the submitted first account and the selected communication number.

Figure 5:
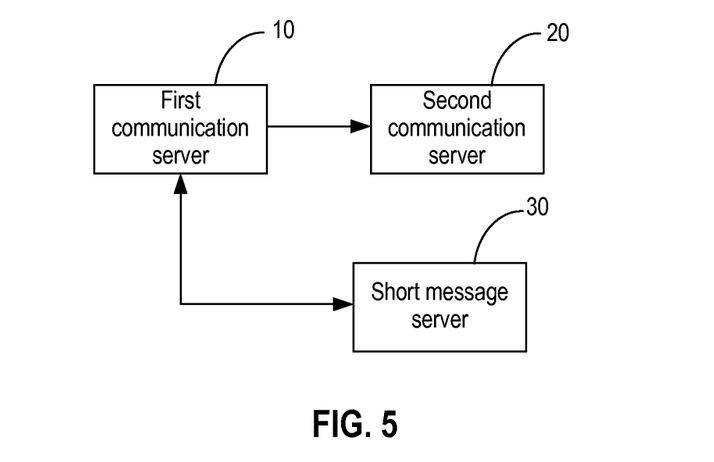
FIG. 5 is a schematic structural diagram of a reminder information pushing system in another implementation.

In another implementation, as shown in FIG. 5, the reminder information pushing system may further include a short message server 30. In this implementation, the communication number is the mobile communication number. The first communication server 10 is configured to, when the reminding time comes, search for the mobile communication number associated with the first account, and send the reminder information and the found mobile communication number to the short message server 30. The short message server 30 is configured to deliver the reminder information to a corresponding mobile communication terminal corresponding to the mobile communication number in the form of a short message.

As more and more people carry one or multiple mobile devices such as smartphone and tablet with them, new software applications have been developed to enable people to communicate with each other at any given moment. At the same time, people still use many existing web-based software applications for various reasons. For example, there is often no easy way to migrate the data from an existing application to a new application especially if the two applications are developed and managed by two different companies. Alternatively, the existing application may provide a service that a user has used for many years and it would cause a lot of inconvenience for the user to stop using it. Sometimes, a new application the user is using may not provide the same service that the existing application offers. In any case, there is a need for establishing a communication channel between two applications, one corresponding to the first communication server 10 and the other one corresponding to the second communication server 20, so that a user can enjoy the benefit offered by both applications without being forced to give up one of them.

For example, there are many web-based calendar applications that enable a user to plan and schedule future events on the calendar, e.g., making a lunch appointment with friends. Meanwhile, a user often uses the calendar application to set up a reminder for him/her to complete a task at a desired date/time. For example, the user may mark on his/her calendar for a dental appointment that may occur a few weeks from now. The user may enter this reminder into a computer server hosting the calendar application using a desktop computer while working. But when it is time for the dental appointment reminder, the user may be having dinner in a restaurant and therefore has no easy access to the calendar application through a desktop computer. Therefore, a communication channel between the calendar application and an instant messaging application that can deliver information to a user's mobile terminal (e.g., smartphone or tablet) in real-time or nearly real-time is useful for the user to receive the reminder.

Figure 6:
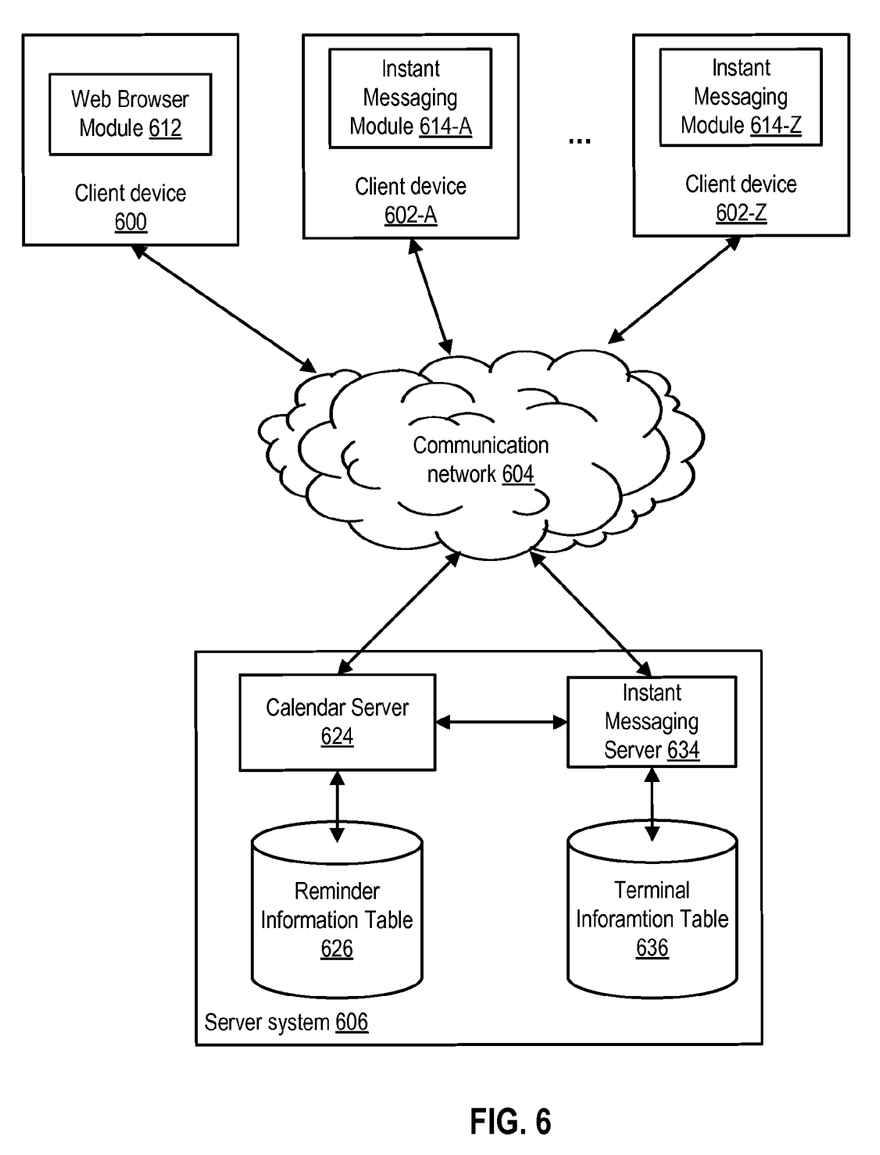
FIG. 6 is a block diagram of a network environment involving multiple clients and a server system forwarding reminders from one client to another client according to some implementations.

FIG. 6 is a block diagram of a network environment involving multiple clients and a server system forwarding reminders from one client to another client according to some implementations. In this example, a user uses the web browser module 612 on the client device 600 (e.g., a desktop) to access his/her account in the calendar server 624 running on the server system 606. In response to a new reminder request from the client device 600, the calendar server 624 generates a new reminder entry in the reminder information table 626 (which may be a database). In some implementations, each reminder entry includes information about a reminder subject and content, one or more delivery destinations, and a reminder delivery schedule. As noted above, the calendar server 624 divides a day into 1440 units (one unit per minute) and scans the reminder information table 626 once every minute to identify reminder entries that should be delivered to their respective destinations and then forwards the reminder entries to the instant messaging server 634. In response to each reminder entry, the instant messaging server 634 queries the terminal information table 636 to determine which terminal(s) the reminder entry should be delivered to. As will be described below, a user of the instant messaging server 634 may specify different destinations for different types of reminders and associate different terminals (mobile or not) with different destinations. Therefore, the instant messaging server 634 needs to work with the calendar server 624 to determine a best strategy of bringing a reminder to the attention of its target user as quickly as possible. For example, if the target user has registered multiple client devices (602-A, . . . , 602-Z) with the instant messaging server 634, the instant messaging server 634 needs to determine which of them is most likely to receive the reminder and bring it to the target user's attention.

Figure 7:
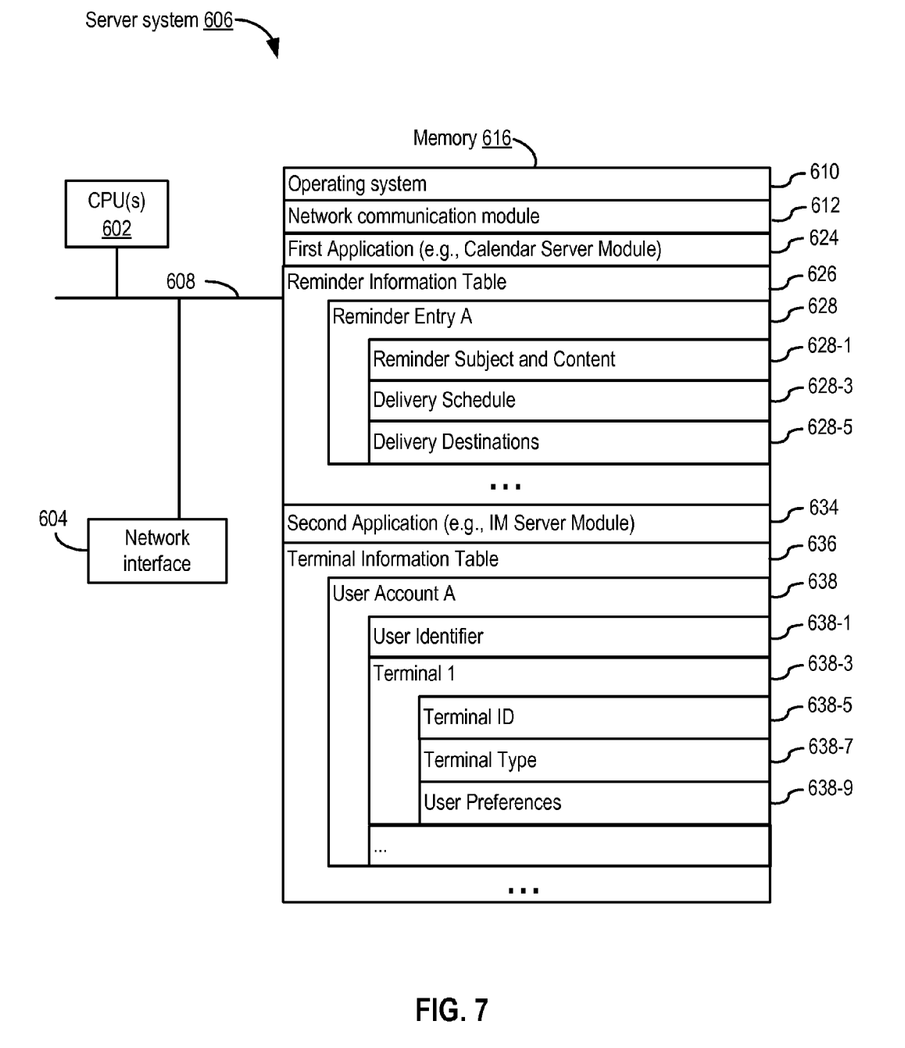
FIG. 7 is a block diagram of a server system for managing and delivering reminders according to some implementations.

FIG. 7 is a block diagram of a server system 606 for managing and delivering reminders according to some implementations. The server system 606 includes one or more processors 602 for executing modules, programs and/or instructions stored in memory 616 and thereby performing predefined operations; one or more network or other communications interfaces 604; memory 616; and one or more communication buses 608 for interconnecting these components. In some implementations, the memory 616 includes high-speed random access memory, such as DRAM, SRAM, or other random access solid state memory devices. In some implementations, memory 616 includes non-volatile memory, such as one or more magnetic disk storage devices, optical disk storage devices, flash memory devices, or other non-volatile solid state storage devices. In some implementations, memory 616 includes one or more storage devices remotely located from the processor(s) 602. Memory 616, or alternately one or more storage devices (e.g., one or more nonvolatile storage devices) within memory 616, includes a non-transitory computer readable storage medium. In some implementations, memory 616 or the computer readable storage medium of memory 616 stores the following programs, modules and data structures, or a subset thereof:

- an operating system 610 that includes procedures for handling various basic system services and for performing hardware dependent tasks;
- a network communications module 612 that is used for connecting the server system 606 to other computers (e.g., the client devices in FIG. 6) via the communication network interfaces 604 and one or more communication networks 604 (wired or wireless), other wide area networks, local area networks, metropolitan area networks, etc.;
- a first application (e.g., a calendar server module 624) for processing a reminder request from a client device 600 and forwarding a reminder to a delivery destination according to a predefined schedule;
- a reminder information table 626 including a plurality of reminder entries submitted by different client devices, each reminder entry 628 further including a reminder subject and content 628-1, a delivery schedule 628-3, and one or more delivery destinations 628-5;

a second application (e.g., an instant messaging server module 634) for receiving reminders from the first application and delivering them to terminals associated with the respective delivery destinations of the reminders; and a terminal information table 636 including a plurality of user accounts of the second application, each user account 638 further including a user identifier 638-1 and one or more terminal entries associated with the user account, each entry 638-3 including a terminal ID 638-5 (e.g., an IP address, a telephone number, an email address, a SIM card number, an IMEI number, a MAC address, etc.), a terminal type 638-7 (e.g., desktop, laptop, smartphone, tablet, etc.), and user preferences 638-9 for receiving the reminders using the terminal (e.g., certain day of a week or certain time period of a day).

It should be noted that the modules, databases, and models in the server system 606 describe above in connection with FIG. 7 may be implemented on a single computer server or distributed among multiple computer servers that are connected by a computer network. For example, it is possible that the first application and the second application are owned by two different companies and run on two different computer servers. There is a communication protocol established to facilitate the data exchange between the first application and the second application, which may be a proprietary one (e.g., if there is an agreement between the two companies or if the two applications are operated by the same company) or a public one.

Figure 8:
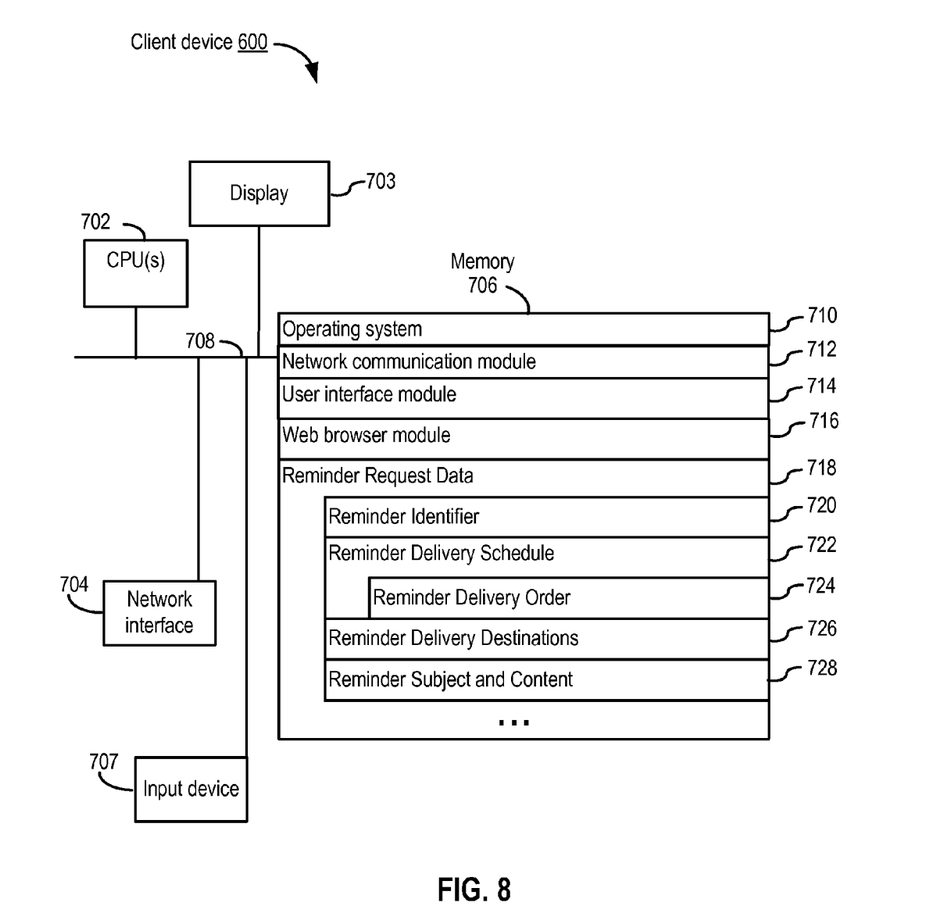
FIG. 8 is a block diagram of a client device for receiving and processing user-provided reminders according to some implementations.

FIG. 8 is a block diagram of a client device 600 for receiving and processing user-provided reminders according to some implementations. The client device 600 includes one or more processors 702 for executing modules, programs and/or instructions stored in memory 706 and thereby performing predefined operations; one or more network or other communications interfaces 704; memory 706; and one or more communication buses 708 for interconnecting these components. In some implementations, the memory 706 includes high-speed random access memory, such as DRAM, SRAM, or other random access solid state memory devices. In some implementations, the client device 600 includes an input device 707 (e.g., a keyboard or mouse) receiving a user's input (e.g., registering a reminder). In some implementations, memory 706 includes non-volatile memory, such as one or more magnetic disk storage devices, optical disk storage devices, flash memory devices, or other non-volatile solid state storage devices. In some implementations, memory 706 includes one or more storage devices remotely located from the processor(s) 702. Memory 706, or alternately one or more storage devices (e.g., one or more nonvolatile storage devices) within memory 706, includes a non-transitory computer readable storage medium. In some implementations, memory 706 or the computer readable storage medium of memory 706 stores the following programs, modules and data structures, or a subset thereof:

an operating system 710 that includes procedures for handling various basic system services and for performing hardware dependent tasks;

a network communications module 712 that is used for connecting the client device 600 to other computers (e.g., the server system in FIG. 6) via the communication network interfaces 704 and one or more communication networks 604 (wired or wireless), other wide area networks, local area networks, metropolitan area networks, etc.;

a user interface module 714 for receiving user inputs in connection with registering a reminder;

a web browser module 716 for processing user inputs and displaying information responsive to the user input (e.g., the current calendar entries associated with a user of the client device 600); and reminder request data 718 including one or more reminder requests submitted by the user of the client device 600 and rendered by the web browser module 716 on the display of the client device, each reminder request 720 further including a reminder identifier 722, a reminder delivery schedule 722 including a reminder delivery order 724, one or more delivery destinations 726, and a reminder subject and content 728.

Figure 9:
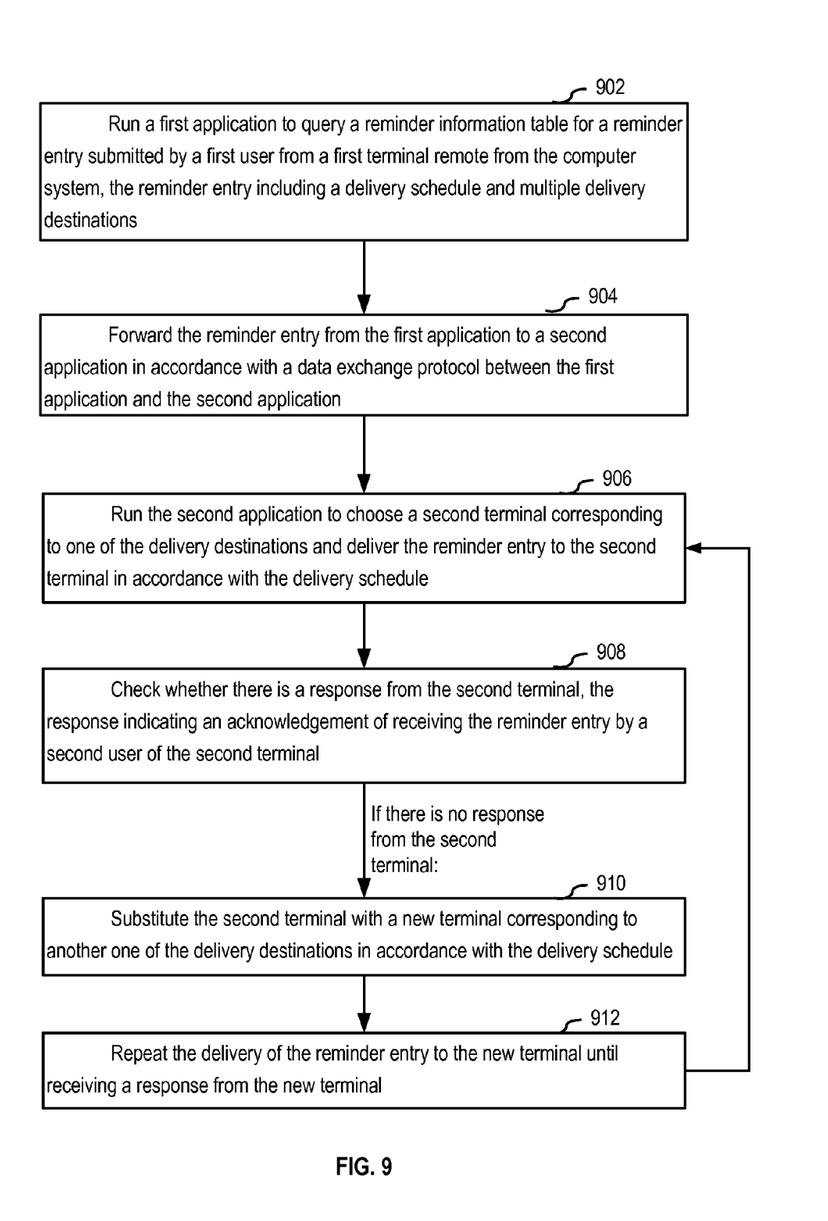
FIG. 9 is a flow chart of a process performed by the server system for managing and delivering reminders according to some implementations.

FIG. 9 is a flow chart of a process performed by the server system 606 for managing and delivering reminders according to some implementations. It is assumed herein that the server system 606 hosts a first application (e.g., a calendar application) and a second application (e.g., an instant messaging application). A user of the calendar application registers reminder requests with the calendar application and specifies when and how to deliver reminders to one or more destinations. In this example, a delivery destination identifies an account at the instant messaging application, which may be owned by the same user or by somebody else. As noted above, the instant messaging application associates each user account with one or more terminals so that it knows to which terminal a reminder is to be delivered.

According to a predefined schedule (e.g., every minute), the server system runs (902) the first application to query the reminder information table (e.g., 626 in FIG. 6) for a reminder entry submitted by a first user from a first terminal (e.g., the client device 600 in FIG. 6) remote from the server system. In some implementations, the reminder entry including a delivery schedule and multiple delivery destinations. As noted above, a user often has multiple terminals for accessing the instant messaging application. Sometimes, the same user even has multiple accounts at the instant messaging application for different purposes (e.g., one for private use and one for work-related matters).

In some implementations, the first application forwards (904) the reminder entry from the first application to a second application in accordance with a data exchange protocol between the first application and the second application. If the second application also runs on the server system 606, the server system 606 then runs (906) the second application to choose a second terminal corresponding to one of the delivery destinations and deliver the reminder entry to the second terminal in accordance with the delivery schedule. In some implementations, the delivery schedule specifies not only a time table of delivering a reminder once or multiple times but also a delivery order based on the user preferences in the terminal information table 636. For example, if the delivery time is in the evening or during the weekend, the user may prefer to receive a reminder on his/her tablet. If the delivery time is in middle of a work day, the user may prefer to receive the reminder on his desktop at work. If there are multiple delivery destinations ready for receiving the reminder, the second application may deliver the reminder to the multiple delivery destinations in parallel. In this case, the user can see the reminder on any terminal corresponding to any of the multiple delivery destinations.

In some implementations, a user prefers not to receive multiple instances of the same reminder on different terminals to avoid any confusion. Instead, the user may specify in the terminal information table that the second application should try one delivery destination at a time and wait for the user to provide a response acknowledging his/her awareness of the reminder before trying another delivery destination in the delivery schedule. So after the delivery of the reminder, the server system checks (908) whether there is a response from the second terminal. For example, when a user clicks on a reminder shown in FIG. 3, a response is sent back to the second application indicating that the user has received and read the reminder. If there is no response from the second terminal, the server system 606 substitutes (910) the second terminal with a new terminal corresponding to another delivery destination in accordance with the delivery schedule and repeats (912) the delivery of the reminder entry to the new terminal until receiving a response from the new terminal. For example, the server system 606 starts a timer after sending a reminder to a particular terminal. If no response comes back from the terminal within a predefined time period and the server system 606 has tried to resend the reminder to terminal for a predefined number of times, the server system 606 may switch to the next destination and its associated terminal in the delivery order until at least one response is returned from one terminal used by the second user. By doing so, the server system 606 reduces the chance of confusing the user with multiple instances of the same reminder. In some implementations, after receiving the response from one of the delivery destinations, the second application forwards the response to the first application in accordance with the data exchange protocol. The first application then updates the corresponding reminder entry in the reminder information table accordingly, e.g., deleting the reminder entry from the reminder information table. As noted above, the second user that receives the reminder may be the same as the first user that generates the reminder request initially.

Figure 10:
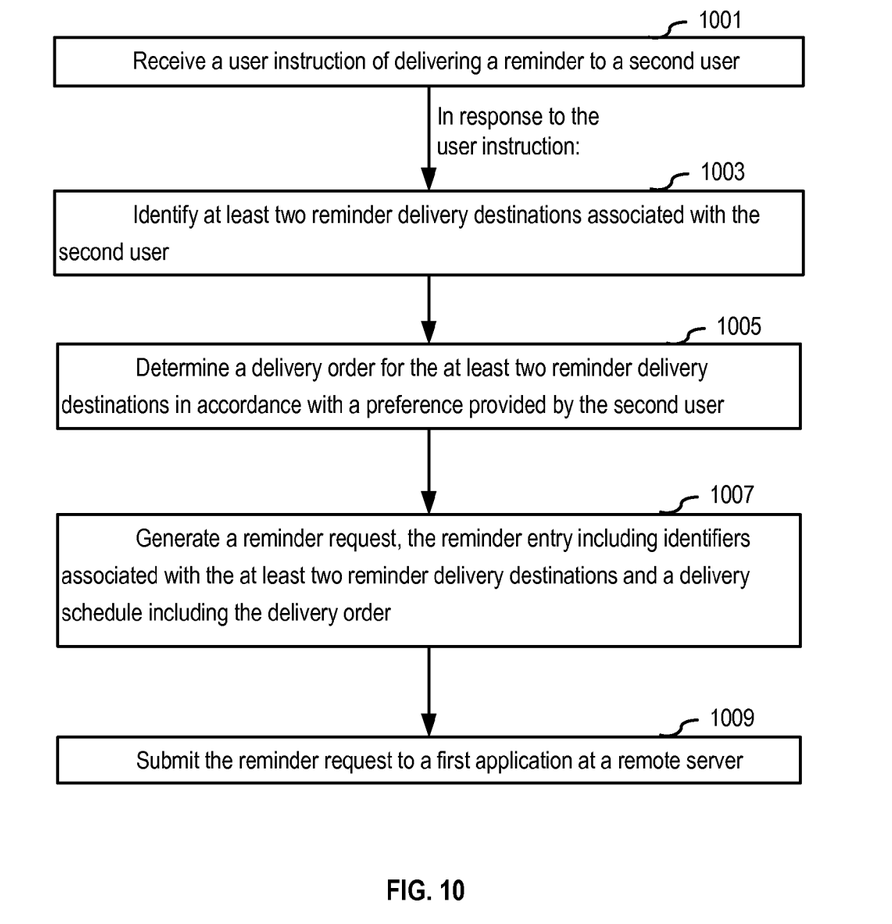
FIG. 10 is a flow chart of a process performed by a client device for receiving and processing user-provided reminders according to some implementations.

FIG. 10 is a flow chart of a process performed by a client device 600 for receiving and processing user-provided reminders according to some implementations. In response to receiving (1001) a user instruction of delivering a reminder to a second user, the client device 600 identifies (1003) at least two reminder delivery destinations associated with the second user. In some implementations, the second user provides multiple accounts at the instant messaging for receiving reminders depending on the nature of the reminders. If a reminder is work-related, the second user may specify an account for receiving the reminder before another account associated with the second user (e.g., a private personal account). The client device 606 receives information about the user-preferred delivery destinations from the second application, e.g., with the help of the first application. After receiving such information, the first user of the client device may provide his or her preference for delivering the reminder.

In some implementations, the client device 600 determines (1005) a reminder delivery order for the reminder delivery destinations in accordance with a preference provided by the second user as well as the preference by the first user of the client device 600 and then generates (1007) a reminder request, the reminder request including identifiers associated with the at least two reminder delivery destinations and a delivery schedule including the delivery order. Next, the client device 600 submits (1009) the reminder request to a first application at a remote server. As noted above, the first application is configured to generate a reminder entry in a reminder information table using the reminder request and invoke a second application to deliver the reminder entry to terminals associated with the at least two reminder delivery destinations in accordance with the delivery order.

Persons of ordinary skill in the art should understand that all or a part of the processes of the methods in the implementations may be implemented by a computer program instructing relevant hardware. The program may be stored in a computer readable storage medium. When the program is run, the processes of the method in the implementations are performed. The storage medium may be a magnetic disk, an optical disk, a Read-Only Memory (Read-Only Memory, ROM), a Random Access Memory (Read-Only Memory, RAM), and the like.

The implementations above are merely some implementations of the present invention, which are specifically described in detail. However, it should not be understood as a limitation to the patent scope of the present invention. It should be noted that, persons of ordinary skill in the art may further make numerous variations and improvements without departing from the concept of the present invention, and the changes and improvements belong to the protection scope of the present invention. Therefore, the protection scope of the present invention shall be subject to the protection scope of the appended claims.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of automatically delivering reminder information to a user-designated terminal, comprising:
   at a computer system having one or more processors and memory for storing one or more programs to be executed by the processors:
      running a first application that provides a first service to query a reminder information table for a reminder entry submitted by a first user using a first account associated with the first application from a first terminal remote from the server system, the reminder entry including a delivery schedule and multiple delivery destinations;
      forwarding the reminder entry from the first application to a second application in accordance with a data exchange protocol between the first application and the second application, wherein the second application is distinct from the first application and provides a second service that is distinct from the first service, and in accordance with the data exchange protocol, the second application is configured to display the reminder entry as a communication received from a contact representing the first application in accordance with the second service;
      running the second application to choose a second terminal corresponding to one of the delivery destinations and, in accordance with a second user logging into the second application using a second account distinct from the first account, deliver the reminder entry to the second terminal in accordance with the delivery schedule, wherein the second terminal is distinct from the first terminal;
      checking whether there is a response from the second terminal, the response indicating an acknowledgement of receiving the reminder entry by the second user at the second terminal;
      in accordance with a determination that there is no response from the second terminal:
         substituting the second terminal with a new terminal corresponding to another one of the delivery destinations in accordance with the delivery schedule; and
         repeating the delivery of the reminder entry to the new terminal until receiving a response from the new terminal.

2. The method of claim 1, further comprising:
   after receiving the response from one of the delivery destinations:
      forwarding the response from the second application to the first application in accordance with the data exchange protocol; and
      running the first application to update the reminder entry in the reminder information table in accordance with the response.

3. The method of claim 2, wherein the step of updating the reminder entry in the reminder information table includes deleting the reminder entry from the reminder information table.

4. The method of claim 1, wherein the step of choosing a second terminal corresponding to one of the delivery destinations and delivering the reminder entry to the second terminal in accordance with the delivery schedule further includes:
   choosing multiple terminals corresponding to respective delivery destinations; and
   delivering the reminder entry to the multiple terminals in parallel; and
   running the first application to update the reminder entry in the reminder information table in accordance with at least one response from any of the multiple terminals.

5. The method of claim 1, wherein the first user and the second user are the same person.

6. The method of claim 1, wherein the first terminal is a desktop and the second terminal is one selected from the group consisting of a laptop, a tablet, and a smartphone.

7. The method of claim 1, wherein the reminder entry further includes an identifier associated with the first user, a reminder subject, and reminder content.

8. The method of claim 1, wherein the first application is a calendar application and the second application is an instant messaging application.

9. The method of claim 1, wherein the first application and the second application are independent applications and they are not parts of another application.

10. The method of claim 1, wherein the data exchange protocol between the first application and the second application is a proprietary data exchange protocol.

11. The method of claim 1, wherein the data exchange protocol between the first application and the second application is a public data exchange protocol.

12. A computer system, comprising:
   one or more processors;
   memory; and
   one or more program modules stored in the memory, the program modules including the following instructions to be executed by the one or more processors:

running a first application that provides a first service to query a reminder information table for a reminder entry submitted by a first user using a first account associated with the first application from a first terminal remote from the server system, the reminder entry including a delivery schedule and multiple delivery destinations;

forwarding the reminder entry from the first application to a second application in accordance with a data exchange protocol between the first application and the second application, wherein the second application is distinct from the first application and provides a second service that is distinct from the first service, and wherein, in accordance with the data exchange protocol, the second application is configured to display the reminder entry as a communication received from a contact representing the first application in accordance with the second service;

running the second application to choose a second terminal corresponding to one of the delivery destinations, in accordance with a second user logging into the second application using a second account distinct from the first account, and deliver the reminder entry to the second terminal in accordance with the delivery schedule, wherein the second terminal is distinct from the first terminal;

checking whether there is a response from the second terminal, the response indicating an acknowledgement of receiving the reminder entry by the second user at the second terminal;

in accordance with a determination that there is no response from the second terminal:
  substituting the second terminal with a new terminal corresponding to another one of the delivery destinations in accordance with the delivery schedule; and
  repeating the delivery of the reminder entry to the new terminal until receiving a response from the new terminal.

13. The computer system of claim 12, wherein the instructions to be executed by the one or more processors further comprise instructions for:
  after receiving the response from one of the delivery destinations:
    forwarding the response from the second application to the first application in accordance with the data exchange protocol; and
    running the first application to update the reminder entry in the reminder information table in accordance with the response.

14. The computer system of claim 13, wherein the step of updating the reminder entry in the reminder information table includes deleting the reminder entry from the reminder information table.

15. The computer system of claim 12, wherein the step of choosing a second terminal corresponding to one of the delivery destinations and delivering the reminder entry to the second terminal in accordance with the delivery schedule further includes:
  choosing multiple terminals corresponding to respective delivery destinations; and
  delivering the reminder entry to the multiple terminals in parallel; and
  running the first application to update the reminder entry in the reminder information table in accordance with at least one response from any of the multiple terminals.

16. The computer system of claim 12, wherein the first user and the second user are the same person.

17. A method of processing a reminder request from a first user at a client device, comprising:
  at the client device having one or more processors and memory for storing one or more programs to be executed by the processors:
    receiving a user instruction of delivering a reminder to a second user;
    in response to the user instruction:
      identifying at least two reminder delivery destinations associated with the second user;
      determining a reminder delivery order for the at least two reminder delivery destinations in accordance with a preference provided by the second user;
      generating a reminder request, the reminder request including identifiers associated with the at least two reminder delivery destinations and a delivery schedule including the delivery order; and
      submitting the reminder request to a first application at a remote server, wherein the first application provides a first service, and the first application is configured to generate a reminder entry in a reminder information table using the reminder request and invoke a second application to deliver the reminder entry to terminals associated with the at least two reminder delivery destinations in accordance with the delivery order, wherein the second application is distinct from the first application and provides a second service that is distinct from the first service, and wherein the second application is configured to display the reminder entry as a communication received from a contact representing the first application in accordance with the second service.

18. The method of claim 17, wherein the first user and the second user are the same person.

19. The method of claim 17, wherein the terminals associated with the at least two reminder delivery destinations include a desktop, a laptop, a tablet, and a smartphone.

20. The method of claim 17, wherein the reminder entry further includes an identifier associated with the first user, a reminder subject, and reminder content.

* * * * *